UNITED STATES PATENT OFFICE.

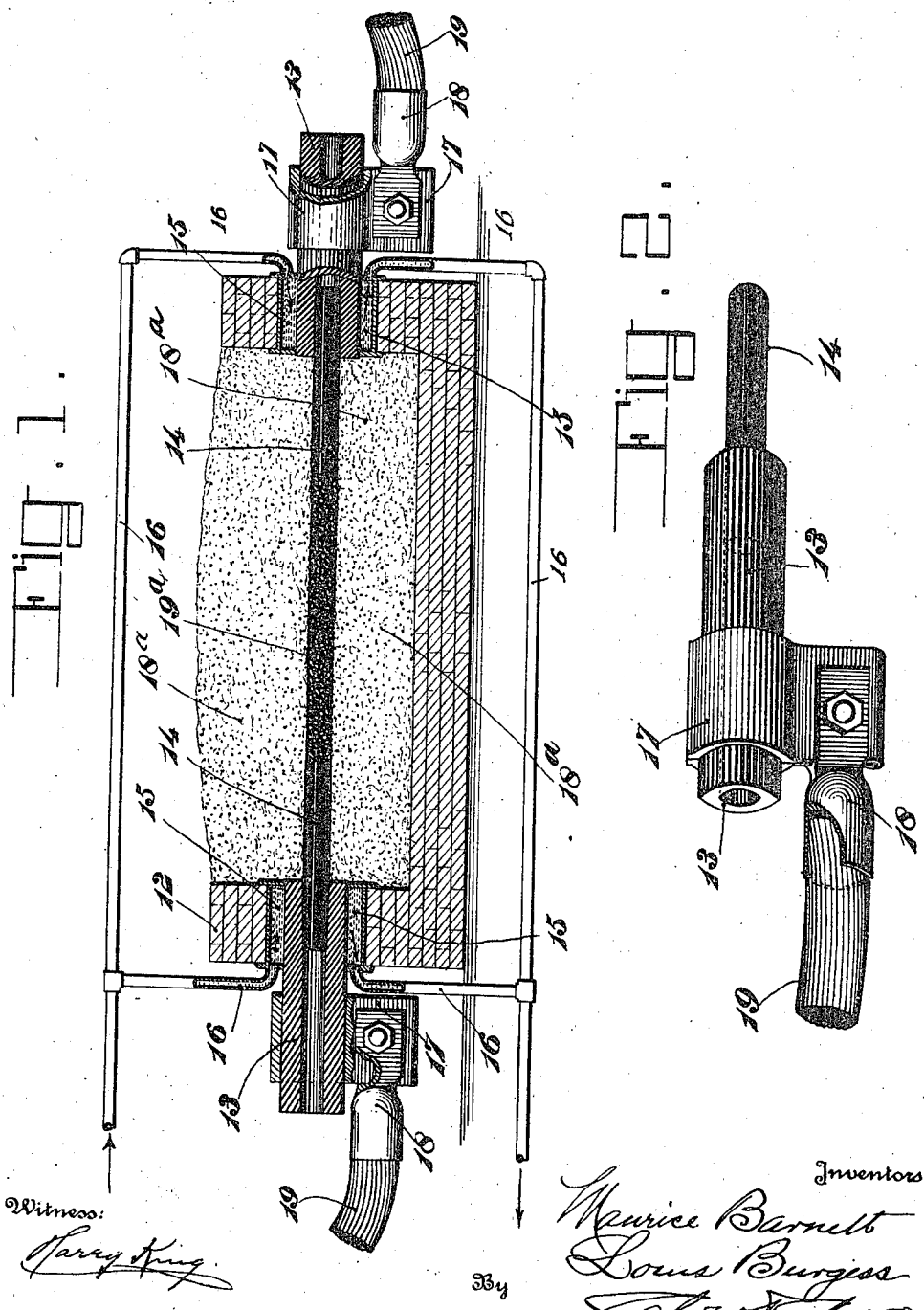

MAURICE BARNETT AND LOUIS BURGESS, OF NEW YORK, N. Y.

ART OF PRODUCING ALUMINUM CARBID.

1,222,593.      Specification of Letters Patent.      Patented Apr. 17, 1917.

Application filed January 26, 1917. Serial No. 144,614.

*To all whom it may concern:*

Be it known that we, MAURICE BARNETT and LOUIS BURGESS, citizens of the United States, residing at New York, in the county of New York and State of New York, have invented or discovered certain new and useful Improvements in the Art of Producing Aluminum Carbid, of which the following is a specification, reference being had thereinto the accompanying drawing.

This invention relates to a method or process for producing aluminum carbid by electrically heating, in a suitable electric furnace, a mixture or charge of alumina (or oxygenated ore of aluminum, such as bauxite) and carbon, or a petroleum residue containing alumina and carbon, in which mixture or residue the carbon is present in an amount in excess of that theoretically necessary to reduce the alumina to metal. In thus subjecting such a mixture or charge to electric heat of suitable intensity portions of said mixture or charge are converted into aluminum carbid.

In the accompanying drawing Figure 1 is a sectional view of an electric furnace or apparatus by which our invention may be carried into effect, and Fig. 2 is a detail view to show more clearly the electrical connections to one of the electrodes.

Referring to the drawing, 12 denotes the walls of an electric furnace, and 13 denotes holders for electrodes 14, the said holders 13 being preferably surrounded by water-jackets 15 mounted in said walls. The water jackets 15 will, in practice, be provided with inlet and outlet pipes 16 so that a circulation of water may be maintained in said jackets for the purpose of preventing the electrode holders from becoming overheated. The holders 13 are preferably formed hollow or tubular, as shown, so that the electrodes may be inserted through them and be caused to extend for suitable distances into the chamber of the furnace, this hollow construction of the holders permitting the electrodes to be knocked out when desired. Electrically connected with the electrodes, by means of attached parts 17 and 18, are suitable conductors 19 by which a current of electricity, either direct or alternating, may be caused to pass.

It will be understood that any suitable electric furnace may be employed in carrying on our process and that the apparatus herein shown and described is only one form of apparatus by which our invention may be carried into effect.

By employing an amount of carbon, in the mixture or charge, in excess of the amount necessary for the reduction of the alumina to metal, but not so much as would be required for the production of straight aluminum carbid, it will be possible to form with the aluminum carbid varying amounts of metallic aluminum which may be desirable in certain operations, as *e. g.* in the manufacture of aluminum chlorid by the process set forth in our U. S. application, Serial No. 114,813, filed August 14, 1916.

The strength of the electric current employed will depend, among other things, on the amount of aluminum carbid to be produced. In operating our process we have employed electric current of a wide range of pressure and density. We have, for instance, employed electric current at five volts and one thousand amperes, at thirty volts and one thousand amperes, also many other combinations.

In carrying out our invention we take alumina, or an oxygenated ore of aluminum, and crush same to about eight mesh. We similarly grind carbon (which may consist of petroleum coke) to the same mesh and then mix the constituents thoroughly, using an amount of carbon in excess of that which would be required to reduce the alumina to metal, preferably about two parts of alumina to one part of carbon. Care should be taken not to use carbon that is too finely crushed, as it is apt to sift away from the charge or be carried away by the escaping gases. The mixture we have used in practice has consisted approximately of two parts of alumina to one part of carbon.

If petroleum residues containing alumina and carbon are employed we may add additional alumina or carbon, as the case may be, to produce a mixture in which the carbon is present in excess of that which would be necessary to reduce the alumina to metal. The residues may then be crushed to about eight mesh.

In mentioning "petroleum residues" we have in mind those residues obtained when petroleum is distilled with aluminum chlorid. As a result of such distillation certain tarry or carbonaceous residues are left which contain alumina or aluminum chlorid, probably in combination with asphaltic matter. The aluminum chlorid may be decomposed by treating the residues with water and heat, which has the effect of hydrolyzing the aluminum chlorid with the production of hydrochloric acid and alumina. By calcining the mass a residue may be obtained useful in the production of aluminum carbid after the constituents, i. e., the alumina and carbon, have been brought into the proper proportions by suitable additions of one or the other constituents.

In the practice of our process a mixture or charge 18ª, of alumina and carbon, is placed in the electric furnace up to or slightly below the level of the bottom of the electrodes. A carbon body 19ª is then placed between and in electrical contact with the electrodes, with the object of establishing an electric circuit and simultaneously acting as a resistance. This carbon body may be solid or may be a core of granulated graphite or amorphous carbon. The electric furnace may then be filled to the top with additional portions of the charge of alumina and carbon. Direct or alternating current of suitable strength is then applied and is continuously passed through the carbon body or core which is thus brought to and maintained at the temperature at which the reaction between the alumina and the carbon takes place to form aluminum carbid. When the operation is first started the resistance of the carbon body, and of the charge, is relatively great, and electric current of higher voltage and lower amperage will be employed than will be the case afterward when the furnace charge is heated and its electrical conductivity thereby increased. Thus, in an electric furnace twenty-four inches long and twenty inches wide, inside measurements, with electrodes twelve inches apart, we have employed a current to start with of one hundred volts and one hundred amperes. After portions of the charge were heated we employed a current of thirty volts and fifteen hundred amperes.

So far as can be judged the heat of the resistance rod or core is communicated to the surrounding charge of alumina and carbon, and when the charge has been brought to a temperature of about two thousand degrees centigrade (2000° C.) aluminum carbid will be formed. As an index of this formation a blue flame of burning carbon monoxid will appear over the surface of the furnace charge or at the edges thereof upon applying a lighted match thereto. This flame will not appear until the temperature of reaction between the alumina and carbon has been reached; so that up to the appearance of the carbon monoxid flame the strength of the current may be successively increased. On the other hand, if the current should be too strong, or if an arc should form between the electrodes, there will be an immediate volatilization of metallic aluminum which will burn in the air with a bright flame giving off clouds of aluminum oxid. When the current is too strong or the presence of an arc is indicated, the electric current should be shut off. The circuit can then be immediately reëstablished and the operation resumed with electric current at a slightly lower voltage.

When the operation has been carried far enough, which will usually be manifest from the appearance of heat at the surface of the charge, the operation may be stopped by cutting off the electric current. After the furnace charge has cooled down it may be broken up, when the aluminum carbid will be found partly in compact masses of more or less crystalline structure and partly diffused through the furnace charge or through the core. Portions of the charge which have not been converted into aluminum carbid may be treated over again in a succeeding charge.

Owing to the fact that the furnace charge, when cool, has very poor conductivity, it will serve to protect the walls of the electric furnace which may consist of brick work without binder and without protective lining.

For the production of aluminum carbid on a larger scale the furnace walls 12 can be built of bricks loosely set up to form a furnace, say thirty-two inches long, twenty-eight inches wide and about twenty inches high, outside measurements. Carbon electrodes 14 about one and a half inches in diameter, suitably held in water-jacketed holders 13 are placed within the furnace about eight inches from the bottom thereof, the ends being about twelve inches apart. With such a furnace and with a current of suitable strength, about twenty pounds of aluminum carbid may be produced in three and a half hours. For large commercial operations the size of the furnace and strength of the current will be increased.

Having thus described our invention or discovery we claim and desire to secure by Letters Patent:

1. The herein described process for producing aluminum carbid, consisting in acting upon a mixture or charge of alumina and carbon by continuously passing an electric current of suitable strength through a carbon or graphitic body or core within the said mixture or charge (the said body or core acting as a resistance in the electric circuit) and utilizing the heat, thereby developed, to bring the mixture or charge to a temperature of approximately 2000° C.

2. The herein described process for producing aluminum carbid, consisting in acting upon a mixture or charge of alumina and carbon by continuously passing an electric current of suitable strength through a carbon or graphitic body or core within the said mixture or charge (the said body or core acting as a resistance in the electric circuit) and utilizing the heat, thereby developed, to bring the mixture or charge to a temperature of approximately 2000° C., or above, but in no event to the temperature of the electric arc.

3. The herein described process for producing aluminum carbid, consisting in acting upon a mixture or charge of alumina and carbon by continuously passing an electric current of suitable strength through a carbon or graphitic body or core within the said mixture or charge (the said body or core acting as a resistance in the electric circuit) and utilizing the heat, thereby developed, to bring the mixture or charge to a temperature of approximately 2000° C., the amount of carbon in the said mixture or charge being in excess of that necessary to reduce the alumina to metal.

4. The herein described process for producing aluminum carbid, consisting in acting upon a mixture or charge of alumina and carbon by continuously passing an electric current of suitable strength through a carbon or graphitic body or core within the said mixture or charge (the said body or core acting as a resistance in the electric circuit) and utilizing the heat, thereby developed, to bring the mixture or charge to a temperature of approximately 2000° C. or above, but in no event to the temperature of the electric arc, the amount of carbon in the said mixture or charge being in excess of that necessary to reduce the alumina to metal.

5. The herein described process for producing aluminum carbid, consisting in acting upon a mixture or charge of alumina and carbon by continuously passing an electric current of suitable strength through a carbon or graphitic body or core within the said mixture or charge (said body or core acting as a resistance in the electric circuit) and utilizing the heat, thereby developed, to bring the mixture or charge to a temperature of approximately 2000° C., said mixture or charge consisting of approximately two parts of alumina to one part of carbon.

6. The herein described process for producing aluminum carbid, consisting in acting upon a mixture or charge of alumina and carbon by continuously passing an electric current of suitable strength through a carbon or graphitic body or core within the said mixture or charge (the said body or core acting as a resistance in the electric circuit) and utilizing the heat, thereby developed, to bring the mixture or charge to a temperature of approximately 2000° C., or above, but in no event to the temperature of the electric arc, said mixture or charge consisting of approximately two parts of alumina to one part of carbon.

7. The herein described process for producing aluminum carbid, consisting in acting upon a mixture or charge of alumina and carbon by continuously passing an electric current of suitable strength through a carbon or graphitic body or core within the said mixture or charge (said body or core acting as a resistance in the electric circuit) and utilizing the heat, thereby developed, to bring the mixture or charge to a temperature of approximately 2000° C., shutting off the electric current, cooling the charge and removing the aluminum carbid produced.

8. The herein described process for producing aluminum carbid, consisting in acting upon a mixture or charge of alumina and carbon by continuously passing an electric current of suitable strength through a carbon or graphitic body or core within the said mixture or charge (said body or core acting as a resistance in the electric circuit) and utilizing the heat, thereby produced, to bring the mixture or charge to a temperature of approximately 2000° C., or above, but in no event to the temperature of the electric arc, shutting off the electric current, cooling the charge and removing the aluminum carbid produced.

In testimony whereof we affix our signatures.

MAURICE BARNETT.
LOUIS BURGESS.